United States Patent [19]

Maskalick

[11] Patent Number: 4,767,518

[45] Date of Patent: Aug. 30, 1988

[54] CERMET ELECTRODE

[75] Inventor: Nicholas J. Maskalick, Pittsburgh, Pa.

[73] Assignee: Westinghouse Electric Corp., Pittsburgh, Pa.

[21] Appl. No.: 872,981

[22] Filed: Jun. 11, 1986

[51] Int. Cl.$^4$ .................................. G01N 27/46
[52] U.S. Cl. .................... 204/242; 204/291; 204/292; 204/421; 204/424; 429/31; 429/33; 429/40; 429/44
[58] Field of Search ............ 204/1 S, 421–429, 204/292, 293, 291, 242; 429/33, 40, 44, 31, 30

[56] References Cited

U.S. PATENT DOCUMENTS

| | | | |
|---|---|---|---|
| 3,503,809 | 3/1970 | Spacil | 204/427 |
| 3,573,107 | 3/1971 | Paris et al. | 429/33 |
| 3,754,995 | 8/1973 | Kleinschmager | 429/33 |
| 3,950,273 | 4/1976 | Jones | 252/517 |
| 4,374,163 | 2/1983 | Isenberg | 427/253 |
| 4,395,468 | 7/1983 | Isenberg | 429/31 |
| 4,459,341 | 7/1984 | Marchant et al. | 429/33 |
| 4,490,444 | 12/1984 | Isenberg | 429/31 |
| 4,535,064 | 8/1985 | Yoneda | 501/138 |
| 4,582,766 | 4/1986 | Isenberg et al. | 429/30 |
| 4,584,085 | 4/1986 | Beaver et al. | 204/292 |
| 4,597,170 | 7/1986 | Isenberg | 29/623.5 |
| 4,609,562 | 9/1986 | Isenberg et al. | 427/8 |
| 4,648,945 | 3/1987 | Isenberg | 204/15 |

OTHER PUBLICATIONS

Chemical Abstracts, vol. 68, 1968, No. 108453t.
Chemical Abstracts, vol. 67, 1967, No. 47755y.
Chemical Abstracts, vol. 69, 1968, No. 13330g.

Primary Examiner—T. Tung
Attorney, Agent, or Firm—Daniel P. Cillo

[57] ABSTRACT

Disclosed is a cermet electrode consisting of metal particles of nickel, cobalt, iron, or alloys or mixtures thereof immobilized by zirconia stabilized in cubic form which contains discrete deposits of about 0.1 to about 5% by weight of praseodymium, dysprosium, terbium, or a mixture thereof. The solid oxide electrode can be made by covering a substrate with particles of nickel, cobalt, iron, or mixtures thereof, growing a stabilized zirconia solid oxide skeleton around the particles thereby immobilizing them, contacting the skeleton with a compound of praseodymium, dysprosium, terbium, or a mixture thereof, and heating the skeleton to a temperature of at least 500° C. The electrode can also be made by preparing a slurry of nickel, cobalt, iron, or mixture and a compound of praseodymium, dysprosium, terbium, or a mixture thereof, depositing the slurry on a substrate, heating the slurry to dryness, and growing a stabilized zirconia skeleton around the metal particles.

5 Claims, 2 Drawing Sheets

CERMET ELECTRODE

The government of the United States of America has rights in this invention pursuant to Contract No. 585847-S awarded by the U.S. Department of Energy.

CROSS-REFERENCE TO RELATED APPLICATIONS

This application is related to application Ser. No. 714,650, filed Mar. 21, 1985 by A. O. Isenberg, entitled "Bipolar Plating of Metal", now U.S. Pat. No. 4,648,945 U.S. patent application Ser. No. 716,865, filed Mar. 28, 1985 by A. O. Isenberg, entitled "Method of Making an Electrode," now U.S. Pat. No. 4,597,170 U.S. patent application Ser. No. 716,864, filed Mar. 28, 1985 by A. O. Isenberg, entitled "High Performance Cermet Electrode," now U.S. Pat. No. 4,582,766 and U.S. patent application Ser. No. 684,438, filed Dec. 20, 1984 by A. O. Isenberg, entitled "Apparatus and Method for Depositing Coating onto Porous Substrate" now U.S. Pat. No. 4,609,562.

BACKGROUND OF THE INVENTION

Solid oxide cells can be operated in either an electrolysis mode or in a fuel cell mode. In an electrolysis mode, electricity and steam are supplied to the cell which then decomposes the steam to form hydrogen and oxygen. In the fuel cell mode, the cell operates in the reverse, burning a fuel such as hydrogen or methane to produce heat and electricity. When standard solid oxide cells are operated in an electrolysis mode, they characteristically respond to increases in water vapor partial pressure with an increase in the over-potential. As a consequence, higher driving voltages are required at high water vapor partial pressures. This means that the cell is less efficient because more voltage is required at a given current in order to produce a given amount of hydrogen and oxygen. A similar effect is noticed when the cell is operated in a fuel cell mode as the increased over-potential (i.e., an increased voltage drop within the cell) results in less electricity being produced for a given amount of fuel.

SUMMARY OF THE INVENTION

I have discovered that if a very small amount of praseodymium oxide is added to the fuel electrode of the solid oxide cell, the over-potential can be reduced by about 30% in the electrolysis mode at 200 mA, which means that about 30% of the energy needed to make hydrogen is saved. This effect of lowering the over-potential also occurs when the cell is operated in the fuel cell mode. In addition, I have found that the addition of praseodymium oxide lowers the resistance of the cell by about half, which greatly increases the efficiency of the cell in both the electrolysis mode and the fuel cell mode. I have found that the praseodymium oxide can be easily added either during the preparation of the fuel cell or after the fuel cell has been made, and that the presence of this compound does not adversely affect the other desirable qualities of the cell.

DESCRIPTION OF THE PREFERRED EMBODIMENTS

Figure 1:
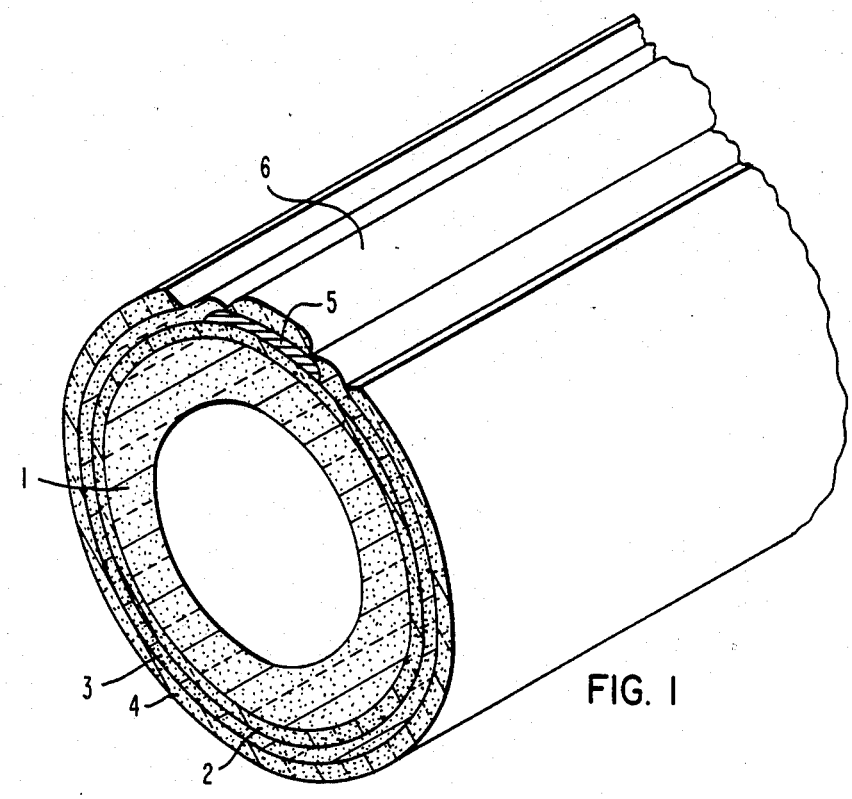
FIG. 1 is an isometric cross-sectional view illustrating a certain presently preferred embodiment of a solid oxide cell according to this invention.
Figure 2:
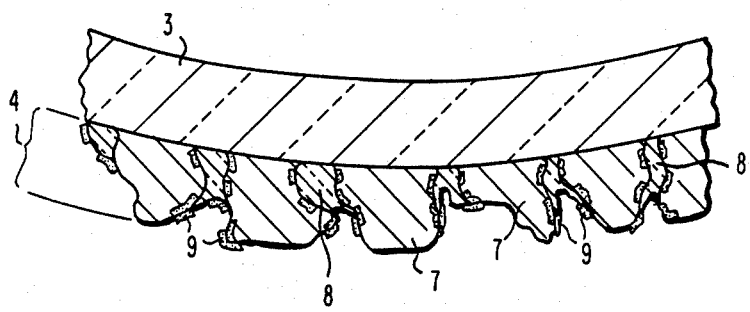
FIG. 2 is an enlarged cross-sectional side view showing details of the electrolyte and fuel electrode portions of the cell shown in FIG. 1.

In FIGS. 1 and 2, a ceramic oxide support tube 1 is coated with a ceramic oxide air electrode 2. Over air electrode 2 is a ceramic oxide electrolyte 3 and a cermet fuel electrode 4. An interconnection 5 is covered with fuel electrode material 6 adjoining cell (not shown). In FIG. 2, electrolyte 3 provides a substrate for the fuel electrode 4. The fuel electrode consists of metal particles 7 which are immobilized and bonded to electrolyte 3 by means of ceramic oxide skeleton 8. The praseodymium oxide 9 is disposed throughout the fuel electrode in a manner depicted in FIG. 2, as discrete deposits.

In the fuel cell mode, a fuel is typically passed over the outside of the cell and a source of oxygen is passed through the inside of the cell. The oxygen migrates through the cell as ions and reacts at the fuel electrode to generate electricity which is conducted through the fuel and air electrodes. In the electrolysis mode, steam is typically passed over the outside of the tube and electricity from an external source is provided through the fuel and air electrodes. The steam is electrolyzed in the fuel electrode and the oxygen that is produced migrates to the center of the tube. A full and complete description of solid oxide cells and their operation can be found in U.S. Pat. Nos. 4,490,444; 4,395,468; and 4,374,163, herein incorporated by reference.

The fuel electrode of this invention is prepared from finely-divided nickel metal particles dispersed through zirconia stabilized in cubic form. Typical stabilizers include yttria, calcia, magnesia, and scandia, but the preferred stabilizer is yttria because the highest electrical conductivities can be obtained. About 7 to about 13 mol % of the stabilizer is added to the zirconia to stabilize it in cubic form. The stabilized zirconia/nickel cermet should contain about 0.1 to about 5% by weight of praseodymium, (based on the total weight of the cermet electrode, including the weight of the metal particles therein). If less than 0.1% is used, very little effect will be seen on the over-potential or cell resistance, and more than about 5% may plug the pores in the electrode and prevent the hydrogen from migrating to the surface in the electrolysis mode. In addition to praseodymium, dysprosium, terbium, or alloys or mixtures of the three elements can also be used in the same manner. The praseodymium, dysprosium, or terbium in the electrode is believed to be in the form of an oxide such as $Pr_6O_{11}$ or $Pr_2O_3$. The metal powder included in the cermet electrode can be nickel, iron, cobalt, or an alloy or mixture thereof. Nickel is preferred because it displays the most resistance to oxidation. The particles preferably have a particle size of about 3 microns to about 5 microns and preferably constitute about 35 to about 45% by volume of the volume of the fuel electrode.

There are two methods by which the electrode can be prepared. In the first method, the nickel particles are spread on a substrate, such as the electrolyte, and a zirconia skeleton is grown around the particles to immobilize them and bind them to the electrolyte. This is conventionally done by an electrochemical vapor deposition process (EVD). A solution of a compound of praseodymium, dysprosium, or terbium is then prepared. The compound may be, for example, a nitrate, chloride, acetate, or oxide; acetates are preferred as they are more soluble and less corrosive. Any solvent can be used in preparing the solution, but water is preferred because it is nonflammable and is not polluting. A suitable concentration is about 1 molar to about 2 molar, although other concentrations can also be used. A sufficient amount of this solution is placed over the cermet electrode to provide a pick-up of about 0.1% to about 5% by weight of the praseodymium, dysprosium, or terbium (based on the weight of the element Pr, Dy, or Tb as a percent of the fuel electrode weight) into the electrode. The electrode is then placed into operation at a temperature in excess of 500° C., which decomposes the compound and forms the oxide of praseodymium, dysprosium, or terbium.

The second method of preparing the cermet electrode according to this invention is to prepare a slurry of the nickel particles and include a soluble praseodymium, dysprosium, or terbium compound in the nickel slurry at a concentration such that the pick-up of the praseodymium dysprosium, or terbium in the electrode will be about 0.1% to about 5.0% (based on the weight of the element Pr, Dy, or Tb as a percent of the total electrode weight). The slurry is then placed over the substrate and is heated to evaporate the liquid that forms the slurry. While any liquid can be used in forming the slurry, water is preferred as it is non-flammable and is not polluting. The zirconia skeleton is then deposited around the coated metal particles. Since the electrochemical vapor deposition conventionally used to deposit the skeleton is normally conducted at about 1300° C., the liquid in the slurry will evaporate if electrochemical vapor deposition is used to prepare the zirconia skeleton.

In both methods, care must be taken not to heat the electrode to the melting point of the zirconia, the praseodymia, the dysprosia, or the terbia or the nickel that is formed, because melting will result in a closure of the pores in the electrode and prevent the migration of gases to the electrode. Of the two methods, the first is preferred as it entails less chance of vaporizing the additive material in the electrochemical vapor deposition reactor.

The solid oxide cell of this invention is particularly useful in an electrolysis process where more than 75% steam is present, as the cell tends to resist overpotential increases under those conditions much more than does a conventional cell.

The following examples further illustrate this invention.

EXAMPLE

The following is a description of the components of the solid oxide cell used in these experiments. The support tube consisted of 15.1 mol % calcia stabilized zirconia closed at one end with a nominal outside diameter of 12 mm, a nominal wall thickness of 1.5 mm, and a porosity of approximately 30%. The anode (i.e., the air electrode) consisted of sintered strontium doped lanthanum manganite having a thickness of about 0.9 to 1 mm, a porosity of approximately 40% and a sheet resistance ($\Omega/\square$) of approximately 0.2 ohms at 1000° C. The electrolyte was 10 to 13 mol % yttria stabilized zirconia having a thickness of 0.025 to 0.040 mm and a $\rho$ of approximately 10 ohm-cm. The cathode (i.e., the fuel electrode) was a nickel zirconia cermet having a thickness of approximately 0.15 mm, a porosity of about 40%, and a sheet resistance of approximately 0.1 ohms at 1000° C. This electrode contained 40% by volume nickel and 20% by volume zirconia. The interconnection was magnesium doped lanthanum chromite having a thickness of about 0.04 mm and an average $\rho$ of 0.7 ohm-cm. The anode and the cathode contact was nickel felt 1 mm×5 mm×220 mm and the anode and cathode bus bars were nickel 3 mm×7 mm×220 mm. The cell edge location on the tubes was 9 mm from the closed end. An $H_2/H_2O$ gauge external to the system monitored exiting product gas. This information, coupled with flow meter readings, was used to estimate hydrogen production for comparison with the ammeter/time (coulombic) estimates. The active cell area is, in general, 50 sq. cm. to 100 sq. cm., depending on actual length.

Figure 3:
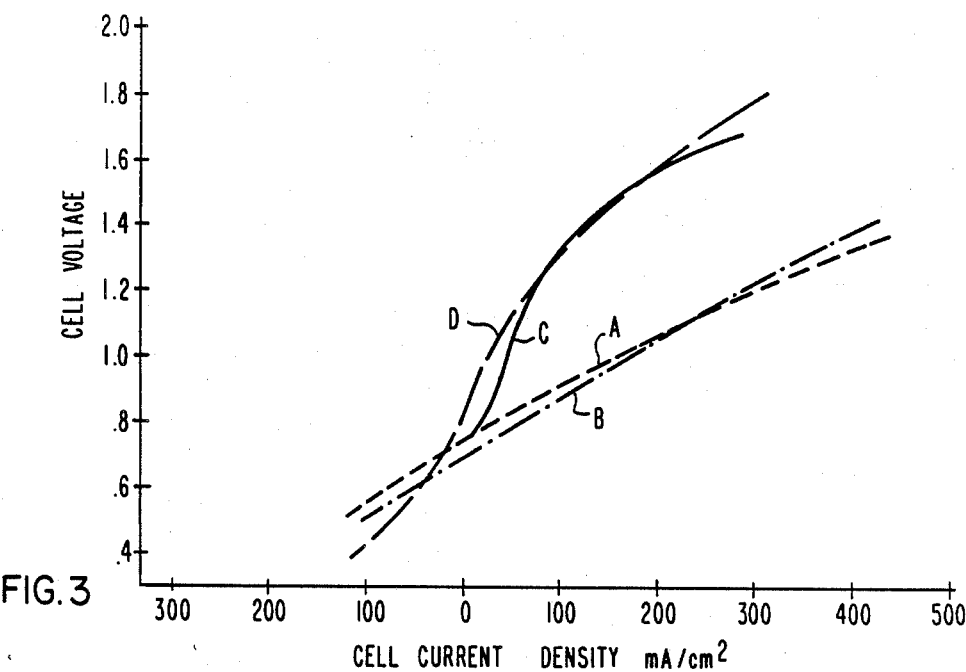
FIG. 3 is a graph of cell current versus cell voltage for experimental cells described in the Examples.

A cell containing 1% praseodymium in the cermet electrode was compared to an identical cell that did not contain the praseodymium in the cermet electrode. The voltage on the cells was increased until the desired current was obtained. FIG. 3 gives the results of these tests. The area to the right of the zero line in FIG. 3 represents the electrolysis mode and the area to the left represents a fuel cell mode. In the fuel cell mode, fuel is passed to the cell and the voltage and current is measured. In FIG. 3, in cell A, the praseodymium was added after cell construction by the absorption of aqueous praseodymium acetate directly onto the nickel cermet electrode. The acetate subsequently decomposed and the praseodymium was incorporated into the electrode as an oxide when it was heated to 1000° C. in 10% $H_2$/90% $H_2O$ vapor. In cell B, the praseodymium was added in solution as the acetate as a component of the aqueous nickel slurry employed in applying and processing the nickel cermet electrode. In this case, the praseodymium component was reacted up to 1300° C. in the electrochemical vapor deposition process used to make the skeleton portion of the electrode. Cells C and D are controls and do not have any praseodymium added. FIG. 3 shows that as a result of adding praseodymium to the electrode, the polarization of the cell was lower in both the electrolysis cell mode and the fuel cell mode of operation.

Figure 4:
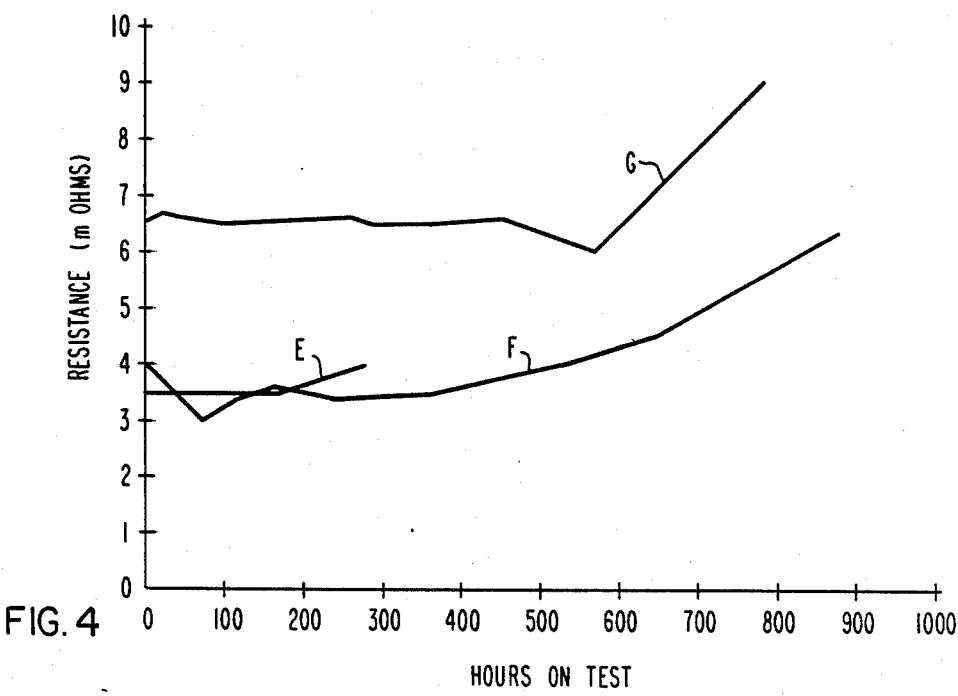
FIG. 4 is a graph of cell resistance versus hours of tests for cells also described in the Examples.

FIG. 4 shows the results of resistance tests performed upon the cells using the electrolysis mode of operation. Cells E and F contained praseodymium deposited by the same method employed for cell B, and cell G is a control cell that did not contain praseodymium. FIG. 4 shows that the cell resistance is much lower when praseodymium is added, an added benefit occurring because of the presence of electrically conductive praseodymium oxides.

I claim:

1. A cermet electrode comprising:
   (A) metal particles selected from the group consisting of nickel, cobalt, iron, and mixtures thereof;
   (B) zirconia stabilized with yttria in cubic form immobilizing said metal particles; and
   (C) discrete deposits of an oxide selected from the group consisting of praseodymium oxide, dysprosium oxide, terbium oxide, and mixtures thereof, where the amount of praseodymium, dysprosium, and terbium in said discrete deposits is from about 0.1% to about 5% by weight of the weight of said cermet electrode.

2. A cermet electrode according to claim 1 wherein said metal particles are nickel.

3. A cermet electrode according to claim 1 wherein said oxide is praseodymium oxide.

4. A ceramic oxide cell comprising a ceramic oxide electrolyte having a ceramic oxide air electrode on one side and a cermet electrode according to claim 1 on the other.

5. A ceramic oxide cell according to claim 4 in the shape of a tube with an air electrode on the inside of said tube and said cermet electrode on the outside of said tube.

* * * * *